Jan. 9, 1968 T. WYATT 3,362,656
DAMPING COUPLER FOR SATELLITE ATTITUDE CONTROL
Filed Nov. 22, 1965 6 Sheets-Sheet 1

INVENTOR
THEODORE WYATT

BY *Claude Funkhouser*
ATTORNEY

MAGNETIC STABILIZATION

GRAVITY GRADIENT STABILIZATION

COMPONENT OF BOOM DEFLECTION IN PLANE OF X-X & Z-Z

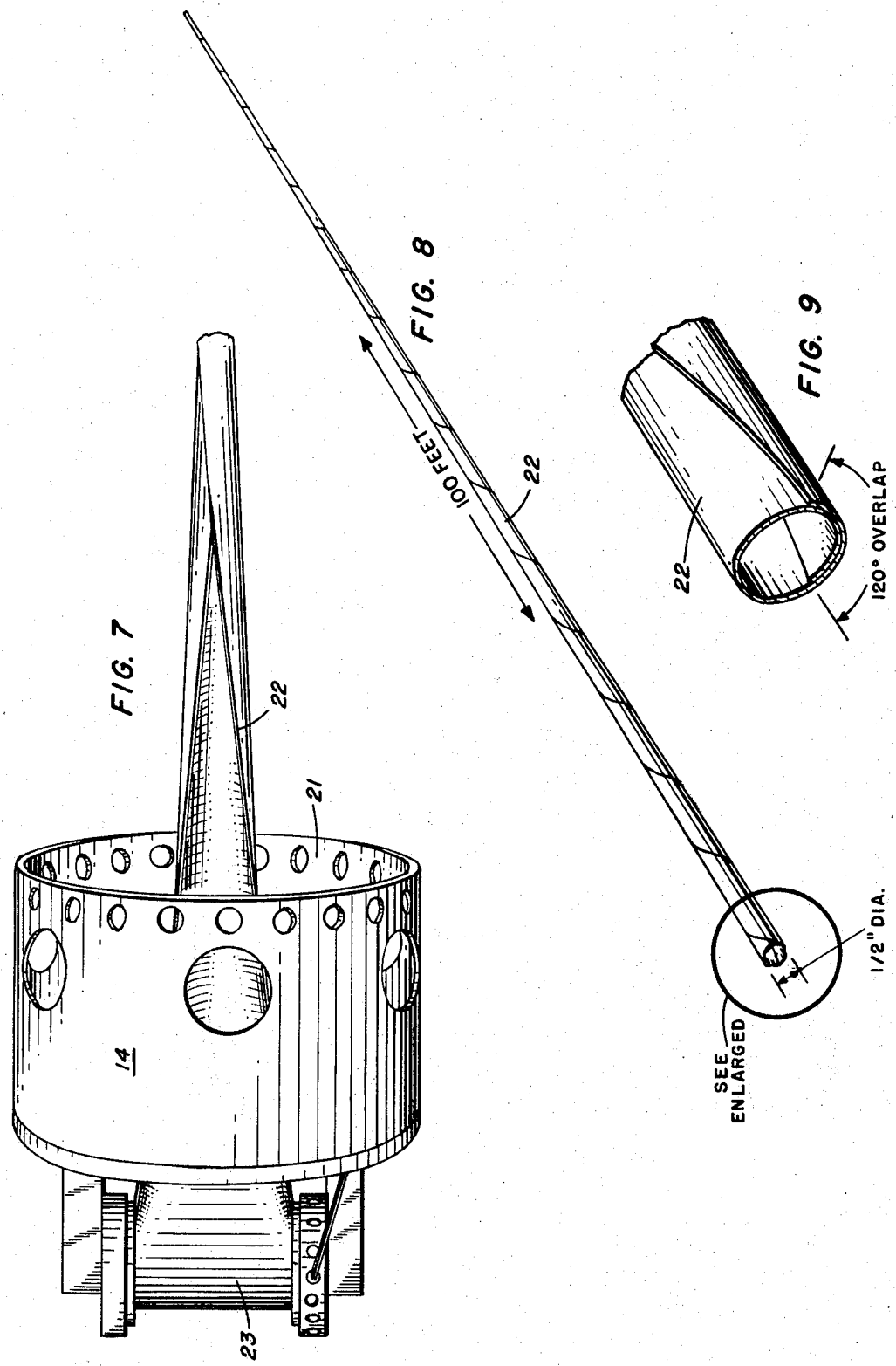

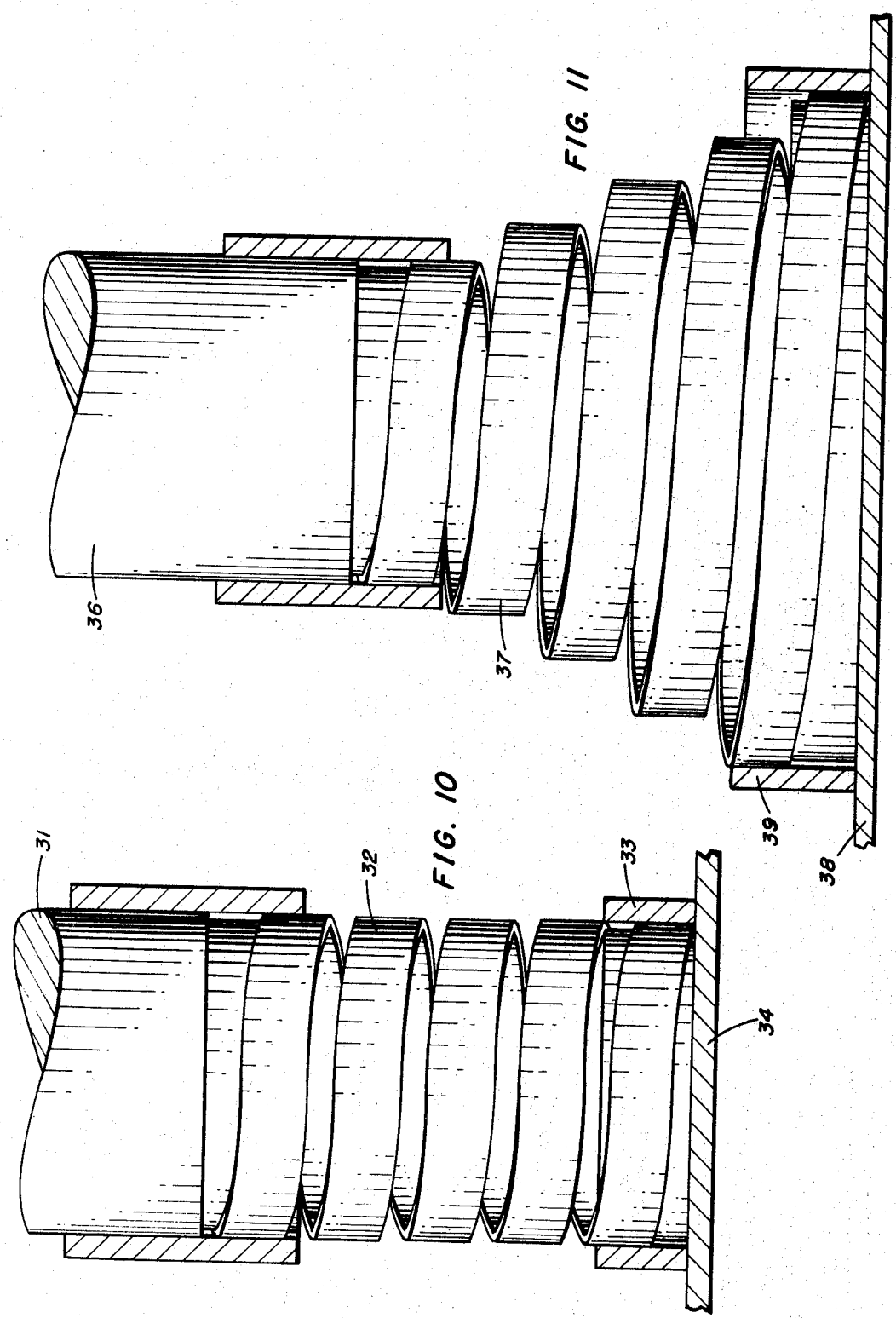

United States Patent Office 3,362,656
Patented Jan. 9, 1968

3,362,656
DAMPING COUPLER FOR SATELLITE
ATTITUDE CONTROL
Theodore Wyatt, Union Bridge, Md., assignor to the United States of America as represented by the Secretary of the Navy
Filed Nov. 22, 1965, Ser. No. 509,689
3 Claims. (Cl. 244—1)

ABSTRACT OF THE DISCLOSURE

A damping coupler in the form of a resilient spiral mast attached to a satellite and supporting a mass at its extremity and characterized by non-ideal deflection to dissipate the rotational, along orbital and cross-orbital motions of the satellite.

---

This invention relates to a method and apparatus for controlling and damping the motion of a satellite when in orbit and more particularly relates to the coupling of the rotational, along-orbit and cross-orbital plane libration motions of a gravity gradient-stabilized satellite so that the dissipation of energy in a process effective about one or more axes will produce damping of motions about all axes.

The present invention was inspired by the findings that magnetic hysteresis loss set forth in Patents 3,114,518 to R. E. Fischell for Magnetic Design Mechanism and 3,118,637 for Magnetic Attitude Control to R. E. Fischell et al. is a primary and effective means of damping the rotational, and cross-orbital libration motions of a gravity gradient stabilized satellite and that the mechanical hysteresis loss in a spring connecting a weight and the end of a boom is a primary and effective means of damping along orbital plane libration oscillations, set forth in Patent 3,148,846 to R. R. Newton for System for Gravity Orienting a Satellite and Patent 3,179,399 to R. T. Ellis for High Energy Damping Spring.

The concept involved in the present invention is that by cross coupling the forces and motions of the three principal axes, one can effectively increase the damping of the entire system and can simplify a satellite by providing only a single damping process which is effective about one or two axes. The low altitude orbits employed in a well known satellite program involve magnetic damping for the magnetic attitude stabilization preparatory to boom extension for gravity gradient capture. The magnetic stabilization and damping technique successfully employed on several prior satellites was selected as a convenient means of getting acceptable initial attitude conditions for capture of an appropriate configuration in the gravity gradient. To be appropriate the configuration at first needed moments of inertia about its three axes which were modest so as to be compatible with readily available magnetic moments for magnetic stabilization and later needed two moments of inertia which were very large compared to the third moment for sufficiently large gravity gradient torques to be produced.

Whereas the magnetic effects are used to advantage in low altitude satellites, there is reason to doubt that the earth's magnetic field has sufficient intensity at very much higher altitudes, such as that employed in a synchronous satellite, for magnetic damping and attitude control to be effective. In this latter case then, it would appear to dispense with the magnetic devices, perform temporary attitude control for gravity gradient capture by some other means such as gas jets, and then employ a mechanical hysteresis loss spring for damping the motion along the orbital plane by the usual method and about the other two axes, wherein the spring is normally ineffective, through cross coupling.

The technique selected for satisfying these changeable moments of inertia requirements is to employ an extensible boom which is extended at the time when it is desired to make the transition from magnetic stabilization to capture within a state of gravity gradient stabilization. The combination of a long boom and a mass on the end of the boom produces an enormous change in the moment of inertia about the two axes orthogonal to the boom axis and provides moments of inertia adequate to provide a gravity gradient torque sufficient to overcome any probable disturbing torque.

It now becomes necessary to damp the libration oscillations of the configuration. If the configuration were perfectly aligned with local vertical at the instant of boom extension, an oscillation having a half angle amplitude of about 40° would result initially as the satellite with an initial angular velocity in inertial space of essentially zero reacted to the stabilization torque resulting from the gravity field which varies in direction through a full cycle in each orbital revolution. Any departure from the local vertical at the instant of boom extension adds to the amplitude of the libration. These oscillations conceivably could be damped out by active means such as properly timed applications of jet reaction forces or magnetic torques. However, a passive means of damping is preferred.

Unless provisions such as those described herein are made, either mechanical hysteresis loss or magnetic hysteresis loss is inadequate as the sole means of damping.

It is an object of this invention to provide means for damping the rotational, along-orbital and cross-orbital oscillations of a satellite, in orbit, so that antenna carried by the satellite can be maintained in a position along a substantially radial line to the earth at all times.

It is another object of the present invention to provide a mass connected to a satellite by a connection having a non-ideal deflection to provide means for coupling the rotational, along-orbital and cross-orbital oscillations of the satellite while in orbit. By "non-ideal deflection" we mean that an application of a force to the structure in one direction causes not only an elastic deflection in that direction but also in one or more additional directions.

It is a further object of the present invention to provide a means of projecting a mass from an earth-orbiting satellite and restraining said mass by a connection with the satellite which connection is in the form of a structure having non-ideal elastic deflection, the mass on the end of the structure serving to constrain the satellite to an attitude wherein one axis points to the center of mass of the earth.

It is a still further object of the present invention to provide a means for establishing a mass connected to a satellite by structural connection having non-ideal elastic deflection, with the connection having negligible mass as compared with the supported mass, the supported mass acting on the satellite through the support serving to couple the rotational, along-orbital and cross-orbital oscillations of the satellite and to maintain the satellite with the same face towards the earth.

It is a still further object of the present invention to provide, for a satellite in orbit, a means for mechanically coupling the rotational, along-orbital and cross-orbital oscillations, said means to comprise a comparatively heavy mass, a comparatively negligible spiral spring support connecting the mass with the satellite, the object being to maintain the same face of the satellite towards the earth.

Other objects, advantages and novel features of the invention will become apparent from the following detailed description of the invention when considered in conjunction with the accompanying drawings wherein:

FIG. 7 is a detailed view of the mass, carrying its spiral spring boom;

FIG. 8 is a pictorial view of the spring boom;

FIG. 9 is an enlarged view of that portion of FIG. 8 within the circle.

FIG. 10 shows a spiral spring support, in elevation connected to a rigid boom;

FIG. 11 is similar to FIG. 10 but with a different type of spring support;

Figure 1:
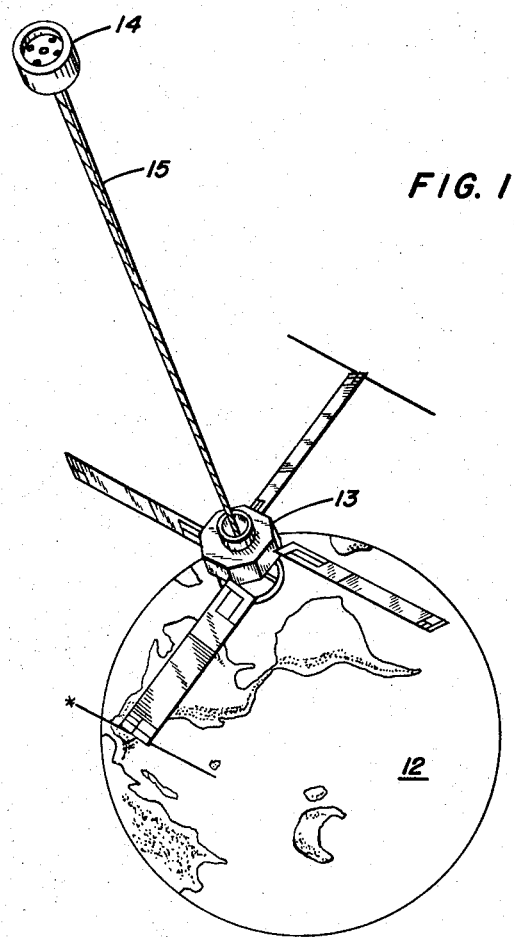
FIG. 1 is a pictorial view of a satellite with an extension boom supporting a mass.

Referring particularly to FIG. 1 of the drawings, the earth is depicted at 12, with a satellite 13 in orbit about the earth. The satellite is illustrated with a mass 14 attached to the satellite by means of a boom 15.

Figure 2:
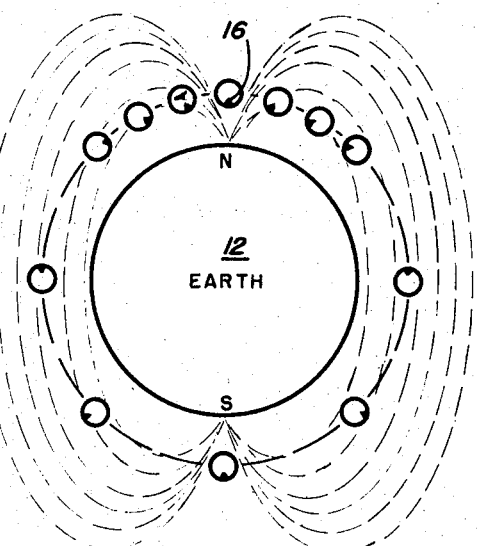
FIG. 2 is a diagrammatic view showing the earth's magnetic field and the rotation of a satellite fitted with magnetic damping.

FIG. 2 shows, in diagrammatic form the earth with magnetic lines of force surrounding it. The orbit of the satellite is within the magnetic field and the rotational and cross-orbital oscillations are being controlled through magnetic hysteresis loss. During this operation the satellite makes two complete revolutions during one orbit of the earth, with the north seeking pole 16 of the electromagnet within the satellite seeking the north magnetic pole of the earth and being repulsed by the south magnetic pole of the earth. Although this operation is useful in damping the rotational motion of the satellite it can only be used as a preliminary operation in the ultimate control of the satellite if it is desired that the satellite be so oriented that it keeps one face always closest to the earth. The satellite is illustrated with a north seeking magnetic pole 16, which is shown in different positions relative to the position of the satellite in orbit showing clearly the double rotation of the satellite during one orbit of the earth.

Figure 3:
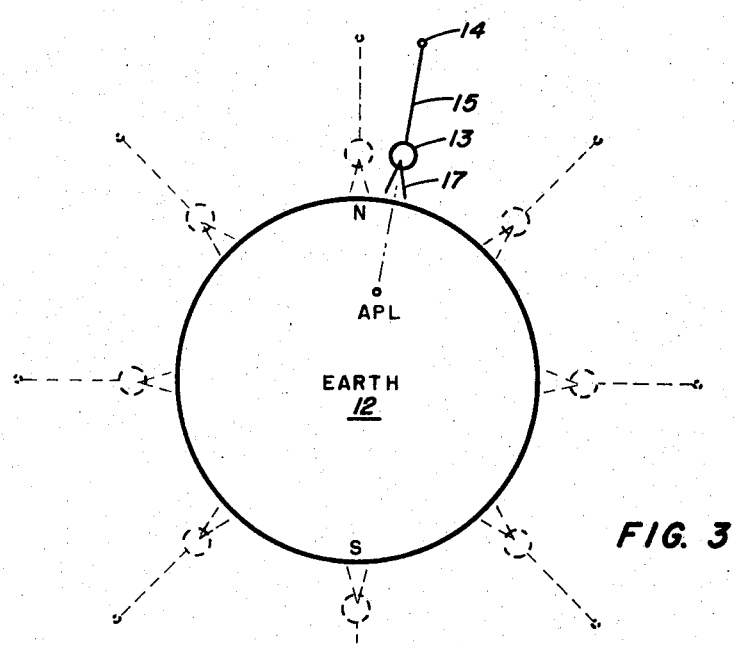
FIG. 3 illustrates a satellite having a directional antenna and fitted with the retained projected mass.

Referring to FIG. 3, the satellite is shown with an antenna 17 and the mass 14 connected to the satellite by the boom 15. It is desirous that the satellite move in its orbit with the antenna always pointing towards the earth.

FIGS. 7, 8 and 9 illustrate one type of boom used to support the mass approximately 100 feet from the satellite. The mass 14 is in the form of a hollow drum 21, in which is carried a rolled spring tape 22. This rolled tape is carried on a roller 23 and released automatically when the mass is projected. One end is attached to the roller and the other end is attached to the satellite. The tape, by reason of its structure, forms a spiral hollow tube which serves as the supporting boom. The overlap is approximately 120°. A tube of this nature displays non-ideal elastic deflection.

Figure 4:
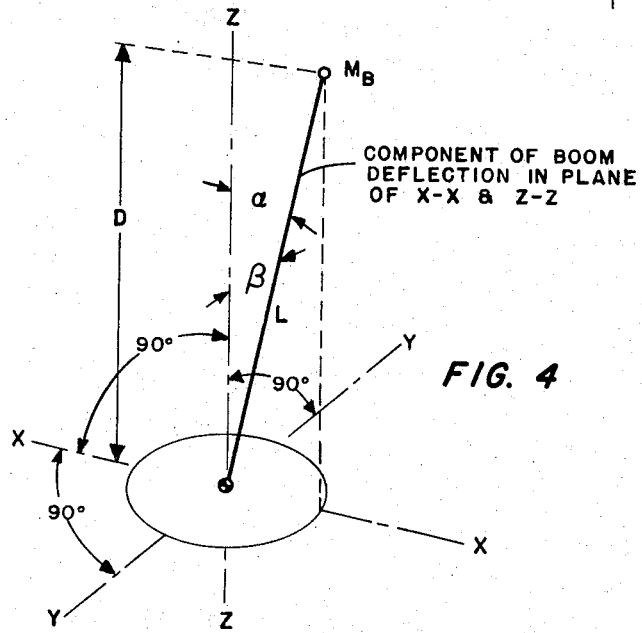
FIG. 4 is a diagram illustrating a theoretical satellite having a mass and a line therethrough indicating the center of gravity, and showing orthogonal coordinates.

Consider a satellite, as shown in FIG. 1, stabilized in the gravity gradient of the earth but possessing libration oscillations. The dynamic equivalent form (FIG. 4) is a circular disk of negligible thickness and mass $M_S$, and a boom with end mass. Axes X—X and Y—Y lie in the plane of the disc. Axis Z—Z is orthogonal to X—X and Y—Y. All three axes intersect at the center of the disk.

Now assume a flexible boom of length L and of negligible mass, and, at the end of the boom, a mass $M_B$. Since $M_S \gg M_B$, the location of the center of mass of the configuration for description of the orbital path is assumed to be the location of $M_S$ at the geometric center of the disk.

Figure 5:
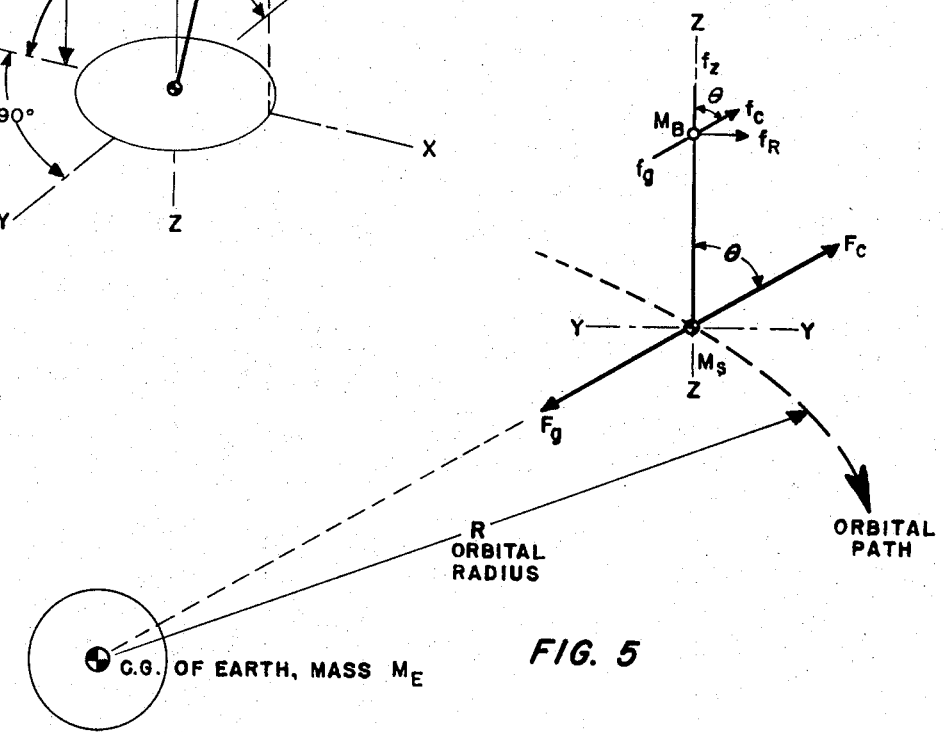
FIG. 5 is a diagram showing the theoretical satellite in orbit with the boom extended, and showing the various force relationships.

Assume an oscillation of amplitude $\theta$ (half angle) about axis X—X. FIG. 5 is a side view looking down axis X—X.

Let $G$ = gravitational constant
$M_E$ = mass of the north
$F_g$ = gravitational force on $M_S$
$F_c$ = centripetal force on $M_S$
$f_g$ = gravitational force on $M_B$
$f_c$ = centripetal force on $M_B$ and, with respect to earth coordinates, $\omega_S$ = orbital angular rate of $M_S$
$\omega_B$ = total angular rate of $M_B$ Consider the situation at the peak of an oscillation, amplitude $+\theta$. Since $$\frac{d\theta}{dt} = 0$$

at this instant $\omega_B = \omega_S$.

Ignoring for the moment the deflection of the boom, the forces acting on $M_B$ are $$f_g = \frac{GM_E M_B}{(R + L \cos \theta)^2}$$

and $$f_c = M_B \omega_S (R + L \cos \theta)$$

so long as $\theta < 90°$, $f_c > f_g$. The restoring torque acting on the satellite about axis X—X is $$T_x = (f_c - f_g) L \sin \theta$$

Figure 6:
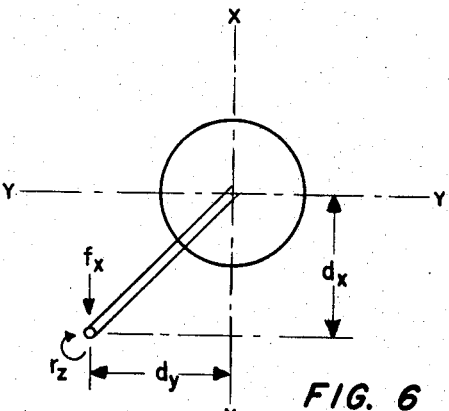
FIG. 6 is a diagram showing the non-ideal elastic deflection of the boom structures described herein.

It is prescribed that the boom be a structure exhibiting non-ideal elastic deflection when a force is applied, such as the forces identified above. This characteristic is illustrated in FIG. 6, which is a view down axis Z—Z toward the satellite (disk). The application of the force $f_x$ (equal to $T_{x/L}$) at the tip of the boom produces the deflection $d_x$ at the tip in the X direction. However, due to the non-ideal deflection characteristic, the force also produces the deflection $d_y$ in the Y direction and a torsional deflection $r_z$ about the Z axis. The application of the force $f_x$ in the opposite direction produces the same three deflections, all in the opposite sense. Similarly, a force applied in the Y direction results in deflection not only in the Y direction but also about the other two axes.

This non-ideal elastic deflection has been observed to be a characteristic of the structures described herein.

Since the end mass $M_B$ is displaced from the center of mass of the satellite (FIG. 4) by a distance $d_y$ or $L \sin \alpha$ there results the torque $$T_Z = T_x L \sin \alpha$$

tending to cause rotation about the axis Z—Z. Another torque tending to cause rotation about the same axis results from the reaction to the deflection $r_z$. It can be seen that this contribution is alternately additive and subtractive to term $T_Z$.

There is a component of the forces on the end mass which is parallel to the axis Z—Z and displaced from the axis Y—Y by the distance $L \sin \alpha$. This force $$f_y = (f_c - f_g) \cos \theta$$

produces a torque about the Y—Y axis $$T_y = (f_c - f_g) L \sin \alpha \cos \theta$$

On substituting in the equations the values for the other extreme of the oscillation, $-\theta$ and $-\alpha$, it is seen that all of the torques change in sign. Thus an apparent ability is demonstrated to couple an oscillation about one axis into oscillations about the other two axes. Telemetry records from satellites in orbit provide experimental evidence that cross-coupling of the oscillations indeed occurs. It is thus to be expected that a single damping process having primary effectiveness in one plane, such as magnetic hysteresis loss in the cross-plane or mechanical hysteresis loss in the along-orbital plane, should damp the oscillations about all axes. Extensive trials with satellites in orbit have confirmed this expectation.

Referring to FIG. 10, a rigid boom 31 takes the place of the boom formed of spiral tape. The end of the boom nearest the satellite is connected to a spiral spring 32 which in turn is seated in a fixture 33. The fixture is part of or firmly attached to the satellite 34.

FIG. 11 shows a modification of that shown in FIG. 10 except that the coiled spring instead of being cylindrical shaped is cone-shaped. In this modification a rigid boom 36 is attached to the smaller end of the cone-shaped spiral spring 37 which is secured to the satellite 38 through a collar or fixture 39.

Figure 12:
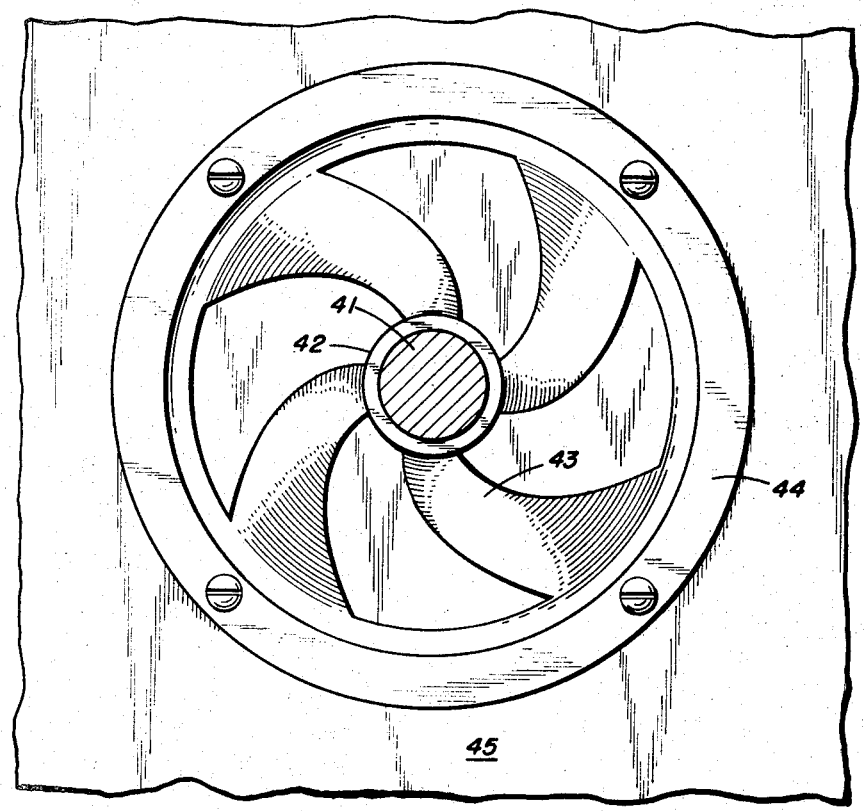
FIG. 12 is a top view of a cross section through the mast showing a modified spring support.
Figure 13:
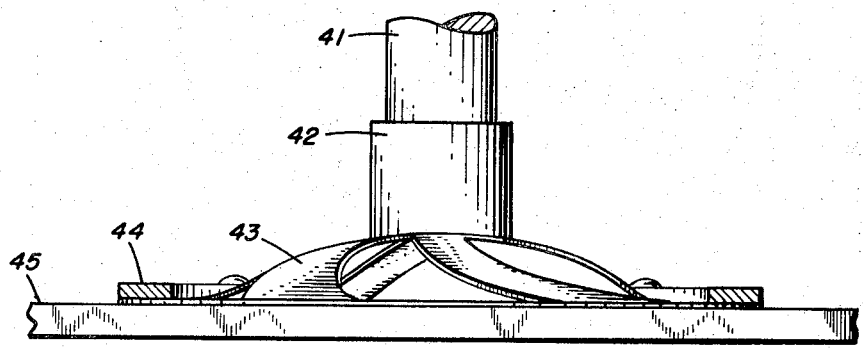
FIG. 13 is an edge view of the spring support of FIG. 12.

FIGS. 12 and 13 show another form of mounting a rigid boom. The boom 41 has its end seated in a ferrule 42 which is affixed to a spiral spring 43. The spring 43 is disk shaped, raised in the center to provide the support for the ferrule 42. The rim of the spiral spring is mounted in a collar 44 which is attached to the satellite 45.

All of the structures shown in the figures have the common aspect of supporting a mass a sufficient distance from a satellite through a spring having non-ideal deflection. The cross-coupling of the spring in combination with a damping process effective about one or two axes serves to effectively damp the rotational, along-orbital and cross-orbital oscillations of the satellite and to maintain the satellite in an orbiting position with the same face towards the earth. With this mechanical coupling apparatus an antenna may be maintained in position to receive or broadcast to the earth throughout the extent of its orbit.

Obviously, many modifications and variations of the present invention are possible in the light of the above teachings. It is therefore to be understood that, within the scope of the appended claims, the invention may be practiced otherwise than as specifically described.

What is claimed is:

1. In a satellite control apparatus including the combination with a satellite having motion damping apparatus which is effective about one axis, of means for coupling the rotational, along-orbital and cross-orbital libration motions of the satellite, by cross coupling, said means comprising:

a boom formed of a resilient tape in spiral formation, overlapping approximately 120° and characterized by non-ideal elastic deflection and connected to and extending away from the satellite; and a mass on the free end of said boom.

2. In a satellite control apparatus the combination according to claim 1:

wherein the diameter of the boom is small in comparison to the length.

3. In a satellite control apparatus, the combination according to claim 1:

wherein the diameter of the spiral boom is approximately one inch and the length is approximately one hundred feet.

References Cited

UNITED STATES PATENTS

| | | | |
|---|---|---|---|
| 2,945,084 | 7/1960 | Daggett | 343—715 X |
| 3,145,948 | 8/1964 | Kershner | 244—1 |
| 3,168,263 | 2/1965 | Kamm | 244—1 |
| 3,270,984 | 9/1966 | Rice | 244—1 |

FERGUS S. MIDDLETON, *Primary Examiner.*